United States Patent Office 2,711,113
Patented June 21, 1955

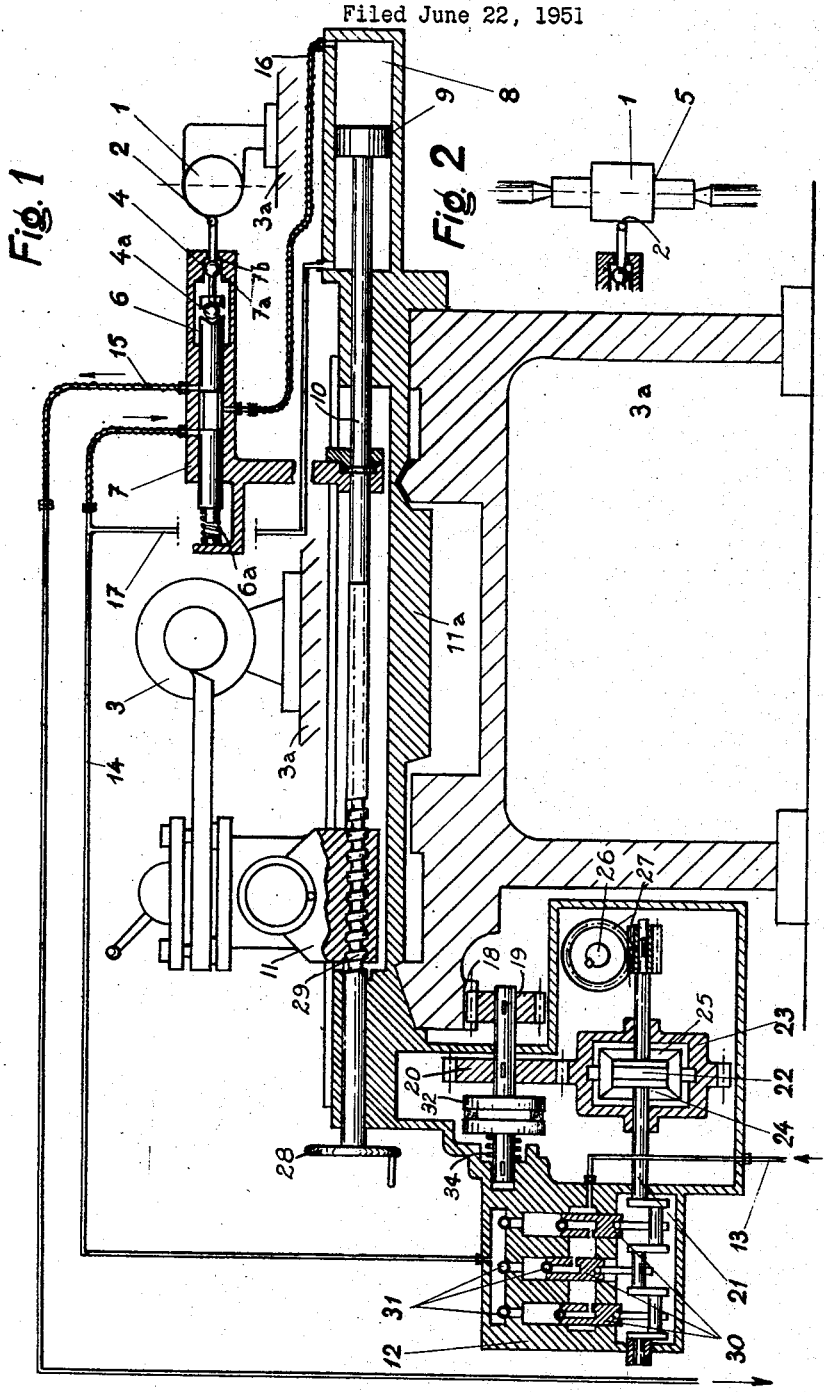

2,711,113

COPYING CONTROL DEVICE

Pierre Audemar, Villesnes-sur-Seine, France, assignor to Societe Olaer Marine, Paris, France, a society of France Application June 22, 1951, Serial No. 232,938

Claims priority, application France July 6, 1950

3 Claims. (Cl. 82—14)

This invention relates to a control mechanism, particularly, but not exclusively, adapted to copying machine tools.

Devices are known in which a suitable automatic relative motion of a tool with respect to a work-piece is controlled from the displacements of a tracer on the profile of a pattern.

Most of known systems of this type, however, while giving good results when said profile is constituted by a comparatively smooth curve are insufficient when said profile offers sudden changes of direction and, more particularly, portions at right-angles with the direction in which the tracer is moving. A few devices have been proposed to overcome this drawback but none of them is sufficiently simple and reliable.

One object of the invention is to provide a simple and safe servo-mechanism for reproducing, with a high degree of fidelity between two parts, such as a tool and a work-piece the relative displacements between a tracer and a pattern profile on which said tracer is continuously maintained, whichever may be the shape of said profile and, in particular, even if the same comprises sudden changes of configuration.

Another drawback of certain known copying control devices is that the two above mentioned relative displacements between a part such as a tool and another part such as a work-piece, are both directly controlled from a profile follower, such as a tracer, which requires intricate transmission mechanisms and a high degree of accuracy in the setting of the device.

Another object of the invention is to provide a servo-mechanism of the type described in which only one of two components of the relative displacement between the above mentioned parts is directly controlled from the tracer, the other component being determined differentially.

Some systems have been proposed in which the control of the tool from the tracer takes place through electric means, so that the operation of the device is exposed to contact failures, response lags and the like.

Another object of the invention is to provide a device of the type described in which all control means are hydraulic, which provides a practically absolute safety of the operation as well as a more rapid response of the tool. These control means comprise a distributor.

Another object of the invention is to provide a device of the type described in which said distributor is of the type described in the U. S. patent application No. 697,845 filed September 19, 1946, by same applicant.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is a sectional view of a copying lathe provided with the device according to the invention, in a plane right-angled with the axes of the work-piece and pattern, said plane containing the axes of the distributor, differential and pump.

Fig. 2 is a detail view showing the pattern profile.

In this example, there is shown at 1 a pattern the profile of which is to be accurately reproduced on a work-piece 3, said pattern and work-piece having parallel axes and being carried on the stationary bed 3a of the machine, and at 2 a tracer scanning said pattern profile. Tracer 2, which is of a known type, has its shank slidably mounted through ball 4 in an axial bore 7a of a distributor 7 having its axis at right-angles with the axis of pattern 1 and rests by its inner end having the shape of a female cone on a ball 4a which rests, in turn, on another female member integral with the sliding valve 6 of distributor 7. This tracer assembly is urged towards the pattern axis through a drawback spring 6a.

This conventional arrangement permits transmitting, directly and in the same direction, to sliding valve 6, the axial displacements of the shank of tracer 2 as well as transforming any nonaxial displacement of said shank into axial displacements of the sliding valve, the latter always taking place in the direction corresponding to the out motion of the tool. An abutment 7b is provided for limiting the displacement of sliding valve 6 in the "in" direction so as to prevent the above mentioned drawback spring to take up said "out" displacement.

Distributor 7 controls a hydraulic circuit feeding a ram the cylinder 8 of which is integral with the tool-saddle which is slidable on bed 3a in the "line" direction, i. e. along a line parallel to the work-piece axis, and the piston 9 of which is interconnected through a rod 10 fast in translation with the cylinder of distributor 7 to the tool carriage 11.

The assembly 11—10—9 is slidably movable with respect to the assembly 11a-8 in the "in-out" direction, i. e. in a direction right-angled to the work-piece axis. The pressure fluid is fed from a pump such as 12 described in detail hereunder.

The hydraulic circuit comprises a fluid intake duct 13 leading into pump 12, a duct 14 feeding the pressure fluid from pump 12 into distributor 7, an outlet duct 15 from distributor 7, another duct 16 interconnecting distributor 7 to ram cylinder 8 on one side of a piston 9 and a duct 17 interconnecting cylinder 8 on the other side of piston 9 to the above mentioned duct 14.

In the example shown, the displacement of the tool-saddle also carrying the whole control device in the line direction is controlled by a pinion 19 meshing with a rack 18 secured on bed 3a.

In the example shown, pinion 19 is driven through another pinion 20 from the cage 23 of differential 22, one sun-wheel 24 of which drives shaft 21 of a pump 12 while its other sun-wheel 25 is rotated at a constant speed by the driving shaft 26 of the machine through suitable gears 27.

In addition to the automatic tool in-out mechanism controlled from ram 8—9, there is provided a hand-wheel 28 for coarsely setting the tool-carriage through a worm 29 meshing with an inner threading provided, for this purpose, on said tool-carriage. Pump 12 should be of the type providing an output whichever may be the way in which the driving shaft 21 rotates, said output being, moreover, as constant as possible and said pump offering a minimum of leakages.

In the example shown, crankshaft 21 actuates three pistons 30, but it is clear that the greater the number of pistons, the more uniform the output of the pump.

The operation of the pump is ensured, in the example shown, by a ball valve system 31.

In order to obtain a normal operation of the device, it is indispensable to provide braking means opposing the rotation of pinions 19 and thence the line displacement. These braking means may be of any suitable type such as mechanical, electromagnetic or hydraulic.

In the example shown, said braking means are constituted by a disc 32 rotatively fast with the shaft of pinions 19 and 20 and by another disc slidably but non rotatably mounted on saddle 11a and continuously urged axially into contact with disc 32 by a spring 34.

It is also particularly contemplated to provide a braking pump which may be of the same type as the main pump 12, this last type of braking means ensuring a smooth and constant braking.

The device operates as follows:

In the position shown in Figs. 1 and 2, tracer 2 is scanning a portion of the pattern profile which is parallel to the axis thereof. During this scanning operation, the tool should be subjected only to a line displacement without any in-out motion. Since tracer 2 remains (in the plane of Fig. 1) in the position shown in this figure, the sliding valve 6 of distributor 7 also remains in the position shown in which the openings of ducts 14 and 15 are closed. As a result, on the one hand, piston 9 remains stationary so that the tool does not move in the in-out direction, while, on the other hand, pump 12 is prevented from discharging, so that shaft 21 and sun-wheel 24 remain stationary, cage 23 is therefore driven with a maximum speed from the constant speed shaft 26. Tool-saddle 11a driven through gears 20, 19 and 18 moves with a maximum speed in a direction parallel to the axis of the workpiece. Both required conditions (no in-out motion, maximum line displacement) are thus met.

Assume now that the tracer reaches a point located opposite shouldering 5 and suddenly moves in a direction right-angled to the pattern axis and towards the same, while it is not displaced at all in the direction parallel to said axis. For reproducing with accuracy shouldering 5 on the work-piece, the tool must be imparted with a maximum "in" motion with no line displacement. Now, as tracer 2 is displaced (in the plane of Fig. 1) sufficiently towards the right, the sliding valve 6 of distributor 7 is imparted with the same displacement and the outlet towards duct 15 is completely opened; pump 12 is thus capable of discharging with a maximum rate into ducts 14—17, which causes a rapid displacement of piston 9 towards the right (in Fig. 1) and, thence, an in motion with a maximum speed of the tool. Since shaft 21 and sun-wheel 24 then rotate with a maximum speed equal to that of sun-wheel 25 rotated from the constant speed shaft 26, cage 23 remains stationary due to the braking provided on the shaft of pinion 20, so that tool-saddle 11a is imparted with no line displacement. The required conditions (maximum "in" motion, no line displacement) are thus met once more.

Since the body of distributor 7 is, as previously mentioned, fast in translation with the rod 10 of piston 9, said "in" motion progressively brings back the cylinder and sliding valve of the distributor into their original relative position, so that the whole assembly is, once more, balanced in the position shown in Fig. 1.

If, conversely, the tracer 2, scanning the lower diameter portion of pattern profile 1, meets shouldering 5, said tracer is tilted, about its ball-pivot mounting at 4 which causes the ball 4a engaged between the cone socket of valve member 6 and the cone socket carried by the tracer to ride over the coned surfaces of these sockets to thereby push the valve member 6 towards the left against the action of spring 6a, whichever may be the direction in which said tilting motion takes place. The inlet of duct 14 into the distributor then opens and pump 12 discharges through said duct 14 and duct 16 into the outer chamber and through duct 7 into the inner chamber of ram cylinder 8. Under these conditions the piston 9 has the working fluid from pump 12 at supply pressure acting in opposite directions upon its two faces, but as the right surface of piston 9 is larger as its left surface, the piston is urged towards the left by a force equal to that produced by the supply pressure acting on the difference between the areas of the two piston faces to thereby cause an "out" motion of the tool. Shaft 21 and sun-wheel 24 rotate as previously with a maximum speed equal to that of the other sun-wheel 25, so that cage 23 remains stationary and so that the tool-carriage is not imparted with any line displacement. The required conditions (maximum out motion, no line displacement) are thus met again. As soon as the tracer has reached the level of the higher diameter portion of shouldering 5, it is released from said shouldering, and ball 4a, under the action of spring 6a, operates to center the tracer laterally so that the same takes its normal axial position again. On the other hand, the "out" motion of rod 10 of piston 9 causes a similar motion of the cylinder of distributor 7, so that the whole assembly reassumes, once more, the balanced position shown in Fig. 1.

It will be easily understood that in all intermediary conditions, the openings of ducts 14 and 15 will be more or less opened, thus permitting pump 12 to rotate faster or slower. Each rotation speed of sun-wheel 24 determined by a given discharge rate of the pump will determine, in turn, a well-defined rotation speed of cage 23, since the other sun-wheel 25 rotates with a constant speed. Thence, each value of the ratio of the opened area of the outlet towards duct 15 (or the inlet of duct 14 into the distributor) to the overall area of said outlet (or inlet) will determine a well defined ratio between the speeds of the in-out and line motions of the tools with respect to the work-piece.

Moreover, according as whether the tool carriage effects its line displacement from the head-stock toward the tail-stock or vice-versa, cage 23 of differential 22 is rotated in one direction or in the opposite direction; therefore, in the same conditions, shaft 21 of pump 12 is rotated either in one direction or in the other. However, as mentioned above, said pump is adapted to provide an output whichever may be the direction in which said shaft 21 rotates.

While the invention has been described with particular reference to a preferred embodiment, it is not intended to limit the scope of the invention to the embodiment illustrated, nor otherwise than by the terms of the subjoined claims.

What is claimed is:

1. In a copying machine tool, the combination of a tool carrier longitudinally and transversely movable with respect to a work-piece, plurality of elements forming a differential gearing and having one element connected to an external source of power and a second element drivingly connected to said tool carrier for producing longitudinal movement, fluid power actuated means for producing transverse movement of said tool carrier including a fluid motor drivingly connected thereto, a pump driven by a third element of said differential gearing for supplying pressure fluid to said motor, valve means including a valve actuating member for controlling the admission of pressure fluid from said pump to said motor, and pattern controlled tracer means operatively connected to said valve actuating member, whereby the movements of said tracer means will cause variable fluid flow to said motor and consequently a variable resistance of said pump against rotation of said third element of said differential gearing so as to vary the movement of said second element and therefore the longitudinal movement of said tool carrier in accordance with the transverse movement thereof to copy the contour of the pattern on said workpiece.

2. In a copying machine tool, the combination of a tool carrier longitudinally and transversely movable with respect to a workpiece, a driving mechanism for producing longitudinal movement of said tool carrier including a differential gearing including several elements and having one element connected to an external source of power and a second element drivingly connected to said tool carrier, a fluid pressure cylinder having a reciprocable differential piston therein drivingly connected to said tool carrier for producing transverse movement thereof, a pump driven by a third element of said differential gearing, said differential piston having its smaller face subjected at all times to the fluid pressure from said pump, a slide valve for controlling flow of fluid from said pump to the larger face of said piston or therefrom to the exhaust, resilient means urging said slide valve constantly in one direction, and a pattern controlled tracer finger associated with said slide valve for shifting the same in the opposite direction against the action of said resilient means.

3. A copying machine tool according to claim 2, in which said driving mechanism for producing longitudinal movement of said tool carrier comprises braking means adapted to retard said driving mechanism while causing said differential piston to be advanced.

References Cited in the file of this patent

UNITED STATES PATENTS 2,051,127 Bickel _____ Aug. 18, 1936